United States Patent [19]

Cummins et al.

[11] 4,273,687

[45] Jun. 16, 1981

[54] PREPARATION OF GUANIDINE PHOSPHATE FOR HARDBOARD FLAME RETARDANT USE

[75] Inventors: Richard W. Cummins, Cranbury; Robert J. Fuchs, Clark; James L. Thomas, Hamilton Square, all of N.J.

[73] Assignee: FMC Corporation, Philadlphia, Pa.

[21] Appl. No.: 103,689

[22] Filed: Dec. 14, 1979

[51] Int. Cl.$^3$ ............................ C08L 1/00; C09K 3/28
[52] U.S. Cl. .................................... 260/17.2; 252/607; 428/541; 428/921; 562/555; 564/59; 564/241
[58] Field of Search ................... 252/607; 260/564 D, 260/17.2; 428/541, 921

[56] References Cited

U.S. PATENT DOCUMENTS

| | | | |
|---|---|---|---|
| 2,114,280 | 4/1938 | Aldred | 260/564 D |
| 2,469,338 | 3/1949 | Mackay | 260/564 D |
| 2,482,755 | 9/1949 | Ford et al. | 8/116.2 |
| 2,488,034 | 11/1949 | Pingree et al. | 427/392 |
| 2,615,019 | 10/1952 | Klapproth | 260/564 D |
| 2,783,276 | 2/1957 | Boatright et al. | 260/564 D |
| 2,917,408 | 12/1959 | Goldstein et al. | 428/541 |
| 3,009,949 | 11/1961 | Craig et al. | 260/564 R X |
| 3,108,999 | 10/1963 | Shaver | 252/437 X |
| 3,159,503 | 12/1964 | Goldstein et al. | 428/541 |
| 3,221,053 | 11/1965 | Prietzel | 260/564 D X |
| 3,819,518 | 6/1974 | Endler | 252/607 |
| 3,926,990 | 12/1975 | Fukuba et al. | 260/564 R X |

FOREIGN PATENT DOCUMENTS

| | | |
|---|---|---|
| 128722 | 8/1948 | Australia . |
| 527746 | 7/1956 | Canada . |
| 49-57693 | 6/1974 | Japan . |
| 606901 | 8/1948 | United Kingdom . |
| 786736 | 11/1957 | United Kingdom . |

OTHER PUBLICATIONS

Myers et al., Forest Products Journal, vol. 25, No. 1, pp. 20–28 (1975).

Sugino, J. Chem. Soc. Japan, vol. 60, pp. 507–512 (1939).

Kobayashi, Bull. Chem. Soc. Japan, vol. 46, pp. 3795–3799 (1973).

*Primary Examiner*—Leland A. Sebastian
*Attorney, Agent, or Firm*—Robert W. Kell; Frank Ianno

[57] ABSTRACT

A guanidine phosphate composition containing both monoquanidine phosphate and diguanidine phosphate and characterized by a weight loss of less than 1% when heated for one hour at 220° C. is prepared by mixing together about equimolar quantities of phosphoric acid and cyanoguanidine and heating this reaction mixture with agitation in the presence of a surfactant to a temperature in the range of 200° C. to 240° C. Agitation is continued for two hours at 200° C. or until foaming stops (about one hour at 240° C.). The guanidine phosphate composition so obtained may be applied to cellulosic materials to render them fire retardant.

22 Claims, No Drawings

In equation 7, 5 moles of cyanoguanidine give 6 moles of guanidine making the conversion yield 120.0%. This product would theoretically contain 9.25% amorphous solids, 23.2% diguanidine phosphate and 67.6% monoguanidine phosphate. Agreement between experimental findings and results predicted by the proposed mechanism appears to be quite satisfactory.

In the first step of the reaction an equimolar slurry of cyanoguanidine and 65% phosphoric acid are heated with stirring from 25° to 125° C. in about 0.8 hours. This first step of the reaction (hydrolysis of cyanoguanidine to carbamoylguanidine phosphate) is initiated at 85°–90° C. and the slurry is converted to a clear boiling liquid which rapidly solidifies to a white friable solid.

The second through the seventh steps of the reaction occur at higher temperatures as the carbamoylguanidine phosphate is gradually heated at atmospheric pressure up to 200°–240° C. At about 180° C. the solid begins to soften and at 190°–195° C. the cake begins to break up on stirring. A non-ionic surface active agent is desirably added in small quantities of about 0.1–0.5% to reduce foaming, which begins at about 200° C. (carbon dioxide and ammonia evolution).

The time required to heat the reaction mixture from 90° C. to about 225° C. is about 1.5 hours, and at 225° C. the melt is uniform with no lumps and little residual foaming. The melt is maintained at a temperature of 200° C. to 240° C. for about two hours or until foaming stops (about one hour at 240° C.).

The product, after heat conditioning for about two hours at 200° C. or one hour at 240° C. may be cooled to room temperature to give a faint tan opaque glass that may be ground in a Wiley Mill to a coarse powder. The product has a weight ratio of monoguanidine phosphate to diguanidine phosphate of about 0.4 to about 0.6, a weight loss of less than 1% when heated to 220° C. for one hour and is useful in the manufacture of flame retardant hardboard.

It is desirable that the concentration of phosphoric acid used in the reaction with cyanoguanidine be about 65% or below for safe handling. The hydrolysis of cyanoguanidine to carbamoylguanidine is an exothermic reaction that is initiated at about 85°–90° C. with vigorous boiling. Phosphoric acid concentrations of above 65% are difficult to handle particularly when the size of the batch is large and more dilute solutions of phosphoric acid contain additional water which must be removed during the reaction. Thus, a phosphoric acid concentration of about 65% is preferred for safe handling consistent with satisfactory conversion yield and product quality.

The amount of phosphoric acid that is reacted with cyanoguanidine in the process of the present invention is desirably about one mole for each mole of cyanoguanidine present in the reaction mixture. Reducing the ratio of phosphoric acid to cyanoguanidine below about 1:1 results in a decrease in yield of the desired guanidine phosphate and increasing the ratio to 1.5:1 and above results in a product that has a weight loss of 1.8% or more at 220° C. after one hour.

The invention will now be described with reference to the following specific Examples which are merely illustrative. All quantities are expressed in parts by weight.

EXAMPLE I

Preparation of Guanidine Phosphate

Cyanoguanidine 168 parts (2 moles) is mixed with 301.6 parts (2 moles) of 65.0% phosphoric acid in a stainless steel beaker having a volume about four times that of the reacting mixture. The mixture is stirred with a spatula while maintaining the temperature at 25° C. The resulting smooth fluid slurry is heated in an oil bath from 25° to 90° C. in 0.35 hour when the slurry clears to a solution and boils vigorously. Within 2 minutes the boiling ceases and the liquid solidifies. This represents the acid-catalyzed hydrolysis of cyanoguanidine (I) to carbamoylguanidine (II),

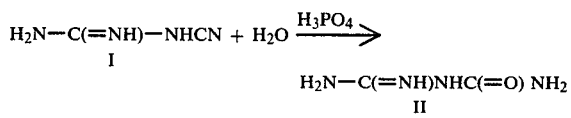

II is a weak base (pK 8.2) and forms a salt with phosphoric acid melting at 178° C. To the solid carbamoylguanidine phosphate is added 1 part (0.2%) of a polyoxyethylated polypropylene glycol base of molecular weight 950 containing 10% polyoxyethylene (total molecular weight 1,045) as a viscosity reducer and foam controller. The heating is continued and at about 180° C. the solid begins to soften and at 190°–195° C. the cake begins to break up with stirring. At about 200° C. the melt begins to foam ($CO_2$ and $NH_3$ evolution) and by 225° C. has become a uniform melt free of lumps with reduced foaming. The time required to heat from 90° to 225° C. is 1.3 hours. After 0.7 hour at 225° C. foaming has largely subsided. Heating is continued at 240° C. for an additional 1.1 hour. The beaker is then cooled to room temperature. The product, a faint tan opaque glass weighing 293 parts has a pH of 6.5 (1% aqueous slurry), an amorphous solids content of 4.8% and a guanidine content of 48.7% (19.4% monoguanidine phosphate). The conversion yield of cyanoguanidine to guanidine is 120.7% based on the stoichiometry, 1 cyanoguanidine→1 guanidine. The weight loss at 220° C. for 1 hour is 0.4%. The product is ground to a coarse powder in a Wiley Mill using a 6-mm screen.

EXAMPLE II

Preparation of Guanidine Phosphate

Cyanoguanidine 336 parts (4.00 moles) is mixed with 603.2 parts (4.00 moles) of 65.0% phosphoric acid in a stainless steel beaker having a volume about four times that of the reaction mixture. The mixture is stirred with a spatula while maintaining the temperature at 25° C. The resulting smooth fluid slurry is heated in an oil bath from 25° to 90° C. in 0.35 hour when the slurry clears to a solution and boils vigorously. Within 2 minutes the boiling ceases and the liquid solidifies. To the solid carbamoylguanidine phosphate is added 1.9 parts (0.2%) of the polyoxyethylated propylene glycol block copolymer of molecular weight 1,045 identified in Example 1 as a viscosity reducer and foam controller. The heating is continued and at about 180° C. the solid begins to soften and at 190°–195° C. the cake begins to breakup with stirring. At about 200° C., the melt begins to foam ($CO_2$ and $NH_3$ evolution) and by 225° C. has become a uniform melt free of lumps with reduced foaming. The time required to heat from 90° to 225° C. is 1.3 hours. After 0.7 hour at 225° C. foaming has

PREPARATION OF GUANIDINE PHOSPHATE FOR HARDBOARD FLAME RETARDANT USE

This invention relates to the preparation of guanidine phosphate compositions and to a method for making the same. The products of the present invention are particularly useful in the manufacture of flame retardant hardboard that will meet or exceed class II requirements.

A number of organic phosphate treatments have been evaluated in an attempt to improve the fire resistance of cellulosic products. Myers and Homes of the U.S.D.A. Forest Service report in the Journal of Forest Products, 20, (1975) that of selected organic phosphate treatments of dry formed hardboard at the 10% level, only the cyanoguanidine-phosphoric acid treatment reduced flame spread by more than 30%. In the eight foot tunnel test, 20% treatment levels of cyanoguanidine-phosphoric acid (prereacted) reduced flame spread below 25%.

Endler, in U.S. Pat. No. 3,819,518 describes a composition useful as a flame retardant for cellulosic materials consisting of from 1 to 5 parts of sodium tripolyphosphate and from 1 to 5 parts of guanidine phosphate (sulfamate, sulfate, boride or chloride). The effectiveness of the mixtures as flame retardants is considered surprising in that sodium tripolyphosphate by itself is quite ineffective. Further, although guanidine phosphate is known as a fire retardant when used alone, it requires a fairly high addon to be effective and renders the treated material too sensitive to heat for most purposes.

U.S. Pat. No. 2,917,408 teaches the chemical treatment of wood to render it flame retardant. Chemicals listed as useful for this purpose include ammonium phosphate, ammonium chloride, ammonium sulfate, borax, boric acid, phosphoric acid, zinc chloride, and magnesium chloride. A solution of dicyandiamide (cyanoguanidine) and phosphoric acid is described as particularly effective. Sugino has prepared guanidine phosphate from cyanoguanidine and phosphoric acid in up to 93% yield by heating 0.5 to 1.5 mole ratios of phosphoric acid to cyanoguanidine at temperatures up to 160° C. J. Chem. Soc. Japan 60, 507 (1939).

It is an object of this invention to provide a process for the manufacture of novel guanidine phosphate compositions that are useful in treating cellulosic materials such as hardboard to render them flame retardant.

In accordance with the present invention, cyanoguanidine (dicyandiamide) is reacted with an equimolar quantity of phosphoric acid under atmospheric pressure at temperatures of 200° to 240° C. and for a conditioning time of about two hours to give 1.2 to 1.3 moles of guanidine per mole of cyanoguanidine, which is 35% more than previously reported. The novel guanidine phosphate compositions so prepared, have properties making them particularly suitable for hardboard fire retardant use, namely, a neutral pH (pH 6-7), low volatility at 220° C. and a weight ratio of mono- to a diguanidine phosphate of about 0.4 to about 0.6. Such guanidine phosphate compositions are prepared by maintaining the conversion temperature in the range of about 200° to about 240° C., the reaction time in the range of about two hours to about one hour and the mole ratio of phosphoric acid to cyanoguanidine at about 1:1. The resulting guanidine phosphate product loses less than 1% of its weight upon being heated for one hour at 220° C., and is useful in the manufacture of flame resistant hardboard.

The percent of cyanoguanidine that is converted to guanidine in accordance with the present invention exceeds 100% and may be as much as 133%. While the present invention is not to be limited by any theory as to the reaction mechanism, the following mechanism is presented to explain how one mole of cyanoguanidine can give up to 1.33 moles of guanidine (133% conversion yield) rather than the maximum of 93% yield obtained by others working in this field.

As described by Sugino in the article noted above, the first step in the reaction of cyanoguanidine with aqueous phosphoric acid at a 1:1 mole ratio is hydrolysis of cyanoguanidine to carbamoylguanidine (I),

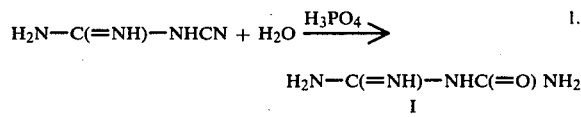

The second step is the hydrolysis of I to carboxyguanidine (II) and $NH_3$,

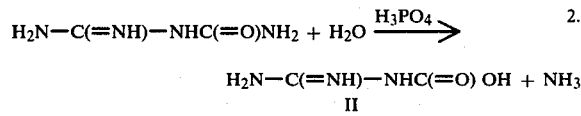

The third step is believed to be the breakdown of II to guanidine and $CO_2$,

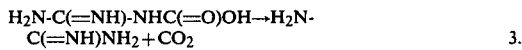

The fourth step is believed to be the reaction of $NH_3$ with carbamoylguanidine to form guanidine and water, $$H_2N-C(=NH)-NHC(=O)NH_2 + 2NH_3 \rightarrow 2H_2N-C(=NH)-NH_2 + H_2O, \quad 4.$$

while the fifth and final step is believed to be the reaction of carbamoylguanidine with water to form $CO_2$, $NH_3$ and $HNCO$ which should polymerize in the presence of $NH_3$ to form cyanuric acid and cyanuric acid amides (amorphous solids),

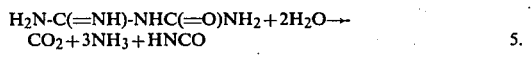

Based on the above five steps two overall equations may be written, one assuming no formation of amorphous solids, i.e., neglecting step 5; and the other assuming the formation of amorphous solids by including step 5. For the case neglecting step 5 the overall equation would be,

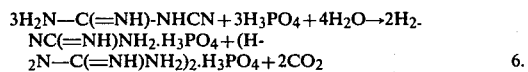

In equation 6, 3 moles of cyanoguanidine give 4 moles of guanidine making the conversion yield 133.3%. The indicated product contains 0.0% amorphous solids, 40.8% diguanidine phosphate and 59.2% monoguanidine phosphate.

For the case assuming formation of amorphous solids by including step 5, the overall equation would be,

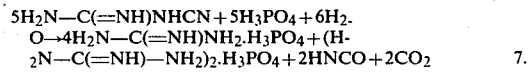

compounds to form a reaction mixture and heating the reaction mixture with agitation in the presence of a surfactant to a temperature in the range of about 200° C. to about 240° C. for about two hours to about one hour.

2. The process of claim 1 wherein said reaction mixture is heated and stirred for about one hour at about 240° C.

3. The process of claim 1 wherein said reaction mixture is heated and stirred for about two hours at about 200° C.

4. The process of claim 1 wherein said guanidine phosphate composition contains about 15 to about 40 weight percent monoguanidine phosphate and about 80 to about 60 weight percent diguanidine phosphate.

5. The process of claim 1 wherein said phosphoric acid is a 65 weight percent solution of phosphoric acid in water.

6. The process of claim 1 wherein a non-ionic surfactant is present in the amount of about 0.1 to about 0.5 weight percent of the said reaction mixture.

7. The process of claim 6 wherein said surfactant is a block copolymer of polyoxypropylene and polyoxyethylene.

8. A guanidine phosphate composition useful in the manufacture of flame resistant hardboard comprising monoguanidine phosphate and diguanidine phosphate, said composition being characterized by a weight loss of no more than 1.0 weight percent when heated for one hour at 220° C., obtained by mixing together about equimolar quantities of phosphoric acid and cyanoguanidine to form a reaction mixture and heating the reaction with agitation in the presence of a surfactant to a temperature in the range of about 200° C. to about 240° C. for about two to about one hour.

9. A guanidine phosphate composition of claim 8 wherein said reaction mixture is heated and stirred for one hour at 240° C.

10. The guanidine phosphate composition of claim 8 wherein said reaction mixture is heated and stirred for two hours at 200° C.

11. The guanidine phosphate composition of claim 8 comprising about 15 to 40 weight percent monoguanidine phosphate and about 80 to 60 weight percent diguanidine phosphate.

12. The guanidine phosphate composition of claim 8 wherein said phosphoric acid is a 65 weight percent solution of phosphoric acid in water.

13. The guanidine phosphate composition of claim 8 wherein said surfactant is a non-ionic surfactant present in the amount of about 0.1 to 0.5 weight percent of the reaction mixture.

14. The guanidine phosphate composition of claim 13 wherein said surfactant is a block copolymer of polyoxypropylene and polyoxyethylene.

15. A flame resistant class II hardboard comprising a uniform mixture of about 100 parts of hardboard chips and from about 20 to 30 parts of a heat stable guanidine phosphate composition containing monoguanidine phosphate and diguanidine phosphate; said guanidine phosphate composition being obtained by heating with agitation for about one to about two hours at a temperature of about 240° C. to about 200° C. a reaction mixture of about equimolar quantities of phosphoric acid and cyanoguanidine in the presence of a surfactant; said uniform mixture being bound together by a thermosetting resin to form the hardboard.

16. The hardboard of claim 15 wherein said reaction mixture is heated and stirred for about one hour to about 240° C.

17. The hardboard of claim 15 wherein said reaction mixture is heated and stirred for about two hours at about 200° C.

18. The hardboard of claim 15 wherein said heat stable guanidine phosphate composition contains about 15 to 40 weight percent monoguanidine phosphate and about 80 to 60 weight percent diguanidine phosphate.

19. The hardboard of claim 15 wherein said phosphoric acid is a 60 weight percent solution of phosphoric acid in water.

20. The hardboard of claim 15 wherein said surfactant is a non-ionic surfactant present in the amount of about 0.1 to about 0.5 weight percent of said reaction mixture.

21. The hardboard of claim 20 wherein said surfactant is a block copolymer of polypropylene oxide and polyethylene oxide.

22. The hardboard of claim 15 wherein said heat stable guanidine phosphate composition is characterized by a weight loss of less than 1% when heated for one hour at 220° C.

* * * * * largely subsided. Heating at 225° C. is continued for an additional one hour. The beaker is then removed from the bath and cooled to room temperature. The product, a faint tan opaque glass has a pH of 6.5 (1% aqueous slurry), an amorphous solids content of 3.9% and a guanidine content of 47.9%. The conversion yield of cyanoguanidine to guanidine is 119.2% based on the stoichiometry, 1 cyanoguanidine→1 guanidine. The weight loss at 220° C. for 1 hour is 0.4%. The product is ground to a coarse powder in a Wiley Mill using a 6-mm screen.

The above preparation is repeated as described in this Example eight times to determine the variability of the process with the following results:

| Example | pH 1% Aq. Soln. | Amorphous Solids (%) | Guanidine (%) | Conversion to Guanidine (%) | % Wt. Loss at 220° C. for 1 hr. (%) |
|---|---|---|---|---|---|
| III | 6.7 | 3.9 | 46.8 | 119.2 | 0.2 |
| IV | 6.5 | 2.8 | 47.9 | 120.6 | 0.8 |
| V | 6.5 | 2.8 | 47.3 | 117.6 | 0.8 |
| VI | 6.5 | 3.0 | 47.4 | 117.8 | 0.4 |
| VII | 6.5 | 3.2 | 47.9 | 118.2 | 0.3 |
| VIII | 6.4 | 3.9 | 47.2 | 116.8 | 0.4 |
| IX | 6.5 | 3.0 | 48.2 | 120.8 | 0.9 |
| X | 6.5 | 3.2 | 47.8 | 118.0 | 0.9 |

| Example | % Wt. Loss at 220°C for 1 hr. (%) |
|---|---|
| III | 0.2 |
| IV | 0.8 |
| V | 0.8 |
| VI | 0.4 |
| VII | 0.3 |
| VIII | 0.4 |
| IX | 0.9 |
| X | 0.9 |

The nine products (Examples II–X) are blended together to make a composite guanidine phosphate composition having a pH (1% aqueous solution) of 6.5, an amorphous solids content of 3.1% and a guanidine content of 46.8% (36% monoguanidine phosphate). The weight loss at 220° C. after one hour is 0.4%.

EXAMPLE XI

Preparation of Hardboard Containing Guanidine Phosphate as Fire Retardant

Exploded hardboard chips containing 2–5% phenol-formaldehyde resin, a binder for dry process hardboard manufacture having good flow characteristics, are blended with 22% of the combined guanidine phosphate composition of Examples II–X by adding a 40% aqueous solids slurry of the guanidine phosphate to the felt in a Patterson Kelly twin cone blender. The amount of nitrogen on the felt is 7.8% and the amount of phosphorus on the felt is 3.5%. The treated felt is dried under atmospheric conditions to 8% or less moisture. Boards (14"×14"×0.200") are preformed from the felt by pressing at 225 psi with the platen at room temperature. The boards are then pressed at 225 psi for 13 seconds using a platen temperature of 465° F. (241° C.). The pressure is then reduced to 82 psi and held at this pressure until the internal board temperature reaches 400° F. (204° C.), when the pressure is released and the board removed. During the pressing, observations are made for smoke and ammonia evolution, for board surface blistering and delamination and for board darkening.

The boards so obtained are light in color and have an oxygen index (ASTM D-2863-77) of 44+. Test strips of this hardboard 2"×14"×0.200" are mounted at a 45° angle to the horizontal and a Fisher burner at full flame is positioned 1.5" below the lower end of the test strip for 1.5 minutes. The length of heavy char measures 1.5 inches.

The flame spread of the fire retardant boards of this Example XI is measured by a seven foot Tunnel Test operated in accordance with ASTM E-84 for the twenty-five foot Tunnel Test. The performance standards used are asbestos-cement board rated at 0 and red oak rated at 100. The New York State building code and Underwriter Laboratories classify flame spread indexes as follows:

| New York | U.L. | |
|---|---|---|
| Class I | (A) | 0–25 |
| Class II | (B) | 26–75 |
| Class III | (C) | 76–200 |
| Class IX | (D) | 201–500 |

The flame spread index of the guanidine phosphate treated hardboard of this Example (7 foot Tunnel Test) is 61, placing the product in Class II. The flame test index is also measured in the laboratory using a MONSANTO two-foot Tunnel Tester operated in accordance with a procedure outlined by H. L. Vandersall, J. Paint Technology 39, 494–500 (1937). The flame spread index is determined by this method to be 55–60.

EXAMPLE XII

Preparation of Hardboard Containing Guanidine Phosphate as Fire Retardant

Exploded hardboard chips containing 2–5% phenol-formaldehyde resin are blended with 22% of the guanidine phosphate composition of Example I by adding a 40% aqueous solids slurry of the guanidine phosphate to the felt in a Patterson Kelly twin cone blender. The amount of nitrogen on the felt is 8.3% and the amount of phosphorus on the felt is 3.2%. The treated felt is dried under atmospheric conditions to 8% or less moisture. Boards (14"×14"×0.200") are preformed from the felt by pressing at 225 psi for 13 seconds using a platent temperature of 465° F. (241° C.) and the pressure released to 0 psi. Pressure is then reapplied to 82 psi and maintained at this pressure until the internal board temperature reaches 400° F. (204° C.), when the pressure is released and the board removed. The board so obtained is light in color, and has an oxygen index (ASTM D-2863-77) of 44+. The 45° burn test results in a char of 1–2 inches, and the flame spread index (determined using a MONSANTO two-foot Tunnel Tester) is 59.

We claim:

1. A process for the manufacture of a guanidine phosphate composition containing monoguanidine phosphate and diguanidine phosphate, said composition being characterized by a weight loss of no more than 1.0% when heated for one hour at 220° C. which comprises reacting about equimolar quantities of phosphoric acid and cyanoguanidine by mixing together the two

UNITED STATES PATENT AND TRADEMARK OFFICE
CERTIFICATE OF CORRECTION

PATENT NO. : 4,273,687

DATED : June 16, 1981

INVENTOR(S) : Richard W. Cummins, Robert J. Fuchs, James L. Thomas

It is certified that error appears in the above—identified patent and that said Letters Patent is hereby corrected as shown below:

Column 1, line 14, "20" should read --20--; line 45, "60" should read --60--. Column 5, lines 26 through 40, second portion of results should be omitted. Column 8, line 24, Claim 16, "to" should read --at--.

Signed and Sealed this

Second Day of February 1982

[SEAL]

Attest:

*Attesting Officer*

GERALD J. MOSSINGHOFF

*Commissioner of Patents and Trademarks*